United States Patent
Wang et al.

(10) Patent No.: US 12,395,361 B2
(45) Date of Patent: Aug. 19, 2025

(54) DEVICE ENCRYPTED AUTHENTICATION METHOD BASED ON STRONG PHYSICAL UNCLONABLE FUNCTION AND DEVICE ENCRYPTED AUTHENTICATION SYSTEM USING THE SAME

(71) Applicant: Wenzhou University, Zhejiang (CN)

(72) Inventors: Pengjun Wang, Zhejiang (CN); Ziyu Zhou, Zhejiang (CN); Hao Ye, Zhejiang (CN); Gang Li, Zhejiang (CN)

(73) Assignee: Wenzhou University, Zhejiang (CN)

( * ) Notice: Subject to any disclaimer, the term of this patent is extended or adjusted under 35 U.S.C. 154(b) by 245 days.

(21) Appl. No.: 18/465,138

(22) Filed: Sep. 11, 2023

(65) Prior Publication Data
US 2024/0430108 A1 Dec. 26, 2024

(30) Foreign Application Priority Data
Jun. 21, 2023 (CN) .......................... 202310741535.3

(51) Int. Cl.
*H04L 9/32* (2006.01)
(52) U.S. Cl.
CPC ................................. *H04L 9/3278* (2013.01)
(58) Field of Classification Search
CPC ......... H04L 9/3278; H04L 63/08; H04L 9/40; H04L 67/12; H04L 9/32; G16Y 30/10
See application file for complete search history.

(56) References Cited

U.S. PATENT DOCUMENTS

| 11,841,983 B2 * | 12/2023 | Pomerance | ............ G06F 21/76 |
| 2024/0169100 A1 * | 5/2024 | Li | ........................... G06F 21/75 |

OTHER PUBLICATIONS

Zhangqing He et al., "A Highly Reliable Arbiter PUF With Improved Uniqueness in FPGA Implementation Using Bit-Self-Test", IEEE Access, vol. 8, Oct. 14, 2020, pp. 181751-181762.
Jieyun Zhang et al., "A 4T/Cell Amplifier-Chain-Based XOR PUF With Strong Machine Learning Attack Resilience", IEEE Transactions on Circuits and Systems—I: Regular Papers, vol. 69, No. 1, Jan. 2022, pp. 366-377.

(Continued)

*Primary Examiner* — Quazi Farooqui
(74) *Attorney, Agent, or Firm* — JCIPRNET (57) ABSTRACT

A device encrypted authentication method based on a strong physical unclonable function is disclosed, including: generating β matrixes formed by random transformation of a $[\sqrt{b}]$-order unit matrix, such that unnecessary device expenditure is reduced; when a sensing device is identified, information to be synchronized between the sensing device and a back-end server is transmitted in the registration phase, such that an attacker cannot obtain confidential information in the encryption phase, and the attacker cannot traverse or completely crack all these possible combinations in a short time; even if the attacker intercepts some CRPs, it is scarcely possible that data sent by the sensing device matches the CRPs collected by the attacker, and with the increase of the number b of bits of challenges and the quick convergence to 0, the accuracy of random guessing is only 50%.

2 Claims, 5 Drawing Sheets

(56) References Cited

OTHER PUBLICATIONS

Durga Prasad Sahoo et al., "A Multiplexer based Arbiter PUF Composition with Enhanced Reliability and Security", IEEE Transactions on Computers, vol. 67, No. 3, Mar. 2018, pp. 403-417.
William S Noble, "What is a support vector machine?" Nature Biotechnology, vol. 24, No. 12, Dec. 2006, pp. 1565-1567.
Kurt Hornik, "Approximation Capabilities of Multilayer Feedforward Networks", Neural Networks, vol. 4, No. 2, Jan. 1991, pp. 251-257.
Guolin Ke et al., "LightGBM: A Highly Efficient Gradient Boosting Decision Tree", Advances in Neural Information Processing Systems 30 (NIPS 2017), vol. 30, Dec. 4, 2017, pp. 3149-3157.

* cited by examiner

DEVICE ENCRYPTED AUTHENTICATION METHOD BASED ON STRONG PHYSICAL UNCLONABLE FUNCTION AND DEVICE ENCRYPTED AUTHENTICATION SYSTEM USING THE SAME

CROSS-REFERENCE TO RELATED APPLICATION

This application claims the priority benefit of Chinese patent application NO. 202310741535.3, filed on Jun. 21, 2023. The entirety of the above-mentioned patent application is hereby incorporated by reference herein and made a part of this specification.

BACKGROUND

Technical Field

The invention relates to an authentication method, in particular to a device encrypted authentication method based on a strong physical unclonable function and a device encrypted authentication system using the same.

Description of Related Art

The Internet of Things (IoT) can realize the connection between objects as well as the connection between objects and humans by acquiring the information of devices and controlling the operating state of the devices based on sensors, device identification, network transmission or other techniques. In recent years, with the rapid application and development of the IoT, the IoT has played an important role in industrial production, education and healthcare, public safety and other fields. Sensing devices can acquire various data such as temperature, humidity, light intensity and movement from the environment, and these data are uploaded to a cloud server to be analyzed and processed. These data can better reflect the state of the environment and sensing devices, and can realize continuous monitoring and optimization. Due to the fact that various sensitive data, such as temperature, location and movement are involved in the communication process of sensing devices, effective security protection is necessary to prevent data leaking caused by hacker attacks. Device authentication is a security protection process for verifying the identity of various sensing devices. Through device authentication, the validity of sensing devices can be determined, and unauthorized access and malicious attacks can be prevented, thus guaranteeing the security and reliability of networks.

Traditional device authentication is generally based on authentication methods and key management: before being accessed to the network, the device acquires an identity certificate, which typically comprise an identity label and a key; after the device is accessed to the network, the identity label and the key of the device will be verified through an authentication method, and access control will be performed according to access rights of the device. However, because the identity label and the key are stored in a memory chip of the device, once the memory chip is intrusively attacked, identity information leakages or alterations may occur easily. The physical unclonable function (PUF), as an emerging security primitive, realizes information acquisition by extracting process deviations generated in the circuit fabrication process, so acquired information does not need to be stored and is nonvolatile. Inputs of the PUF are called challenges, outputs of the PUF are called responses, and sets of challenges and corresponding responses are called challenge response pairs (CRPs). The strong PUF with an exponential number of CRPs is extremely suitable for IoT device authentication, so device authentication methods based on the strong PUF are of great significance for guaranteeing the transmission security of IoT.

Due to the intrinsic correlation between input challenges and output responses of the strong PUF, attackers can steal data of the strong PUF and launch a machining learning (ML) modeling attack. Once information is transmitted, the attacker can steal the PUF information in the channel transmission process to construct a PUF model, and then disguise the PUF model as a device to send Trojan virus to a server or prevent other devices from accessing the server. Various structures have been purposed successively to improve the security of device authentication methods based on the strong PUF. For example, an anti-ML attack authentication method based on a self-aliasing structure has a powerful aliasing capacity for over-voltage authentication and strong PUFs, and can reduce modeling accuracy greatly; an QR-PUF can construct a security QR code based on a key stream generated by a PUF to realize security identification and can further resist various attacks through LFSR aliasing; the one-time PUF configured by the PUF will be changed every time a conversation is completed in the authentication process, such that attackers cannot collect sufficient data for modeling. However, the broad application scenarios of IoT sensing devices lead to a great difference in security requirements, so traditional device authentication methods adopting a unified authentication process will cause severe resource waste of the sensing layer, in addition, due to the quick iteration of attack methods, once the PUF structure of one IoT node is cracked, other nodes will be exposed to a great risk.

SUMMARY

The technical issue to be settled by the invention is to provide a device encrypted authentication method based on a strong physical unclonable function, which has a high anti-attack capacity, can enhance the authentication security of IoT sensing devices, and allows users to configure encryption algorithms according to device environments to avoid resource waste of the sensing layer.

The technical solution adopted by the invention to settle the above technical issue is as follows: a device encrypted authentication method based on a strong physical unclonable function comprises the following steps:

Step 1: acquiring a PUF circuit for providing identity information for authentication, wherein the PUF circuit is a strong PUF constructed based on an APUF; denoting the number of bits of input challenges of the PUF circuit as b, wherein b is an integer which is greater than or equal to 10; then, constructing a mathematic model of the PUF circuit by a logistic regression machine learning algorithm, which specifically comprises:

Step 1-1: randomly generating n groups of b-bit challenges on a back-end server with a storage capacity and an operational capacity, wherein n is an integer which is greater than or equal to 1000 and less than or equal to $2^b$, and the n groups of b-bit challenges are all binary data;

Step 1-2: sequentially inputting the randomly generated n groups of b-bit challenges to the PUF circuit, outputting, by the PUF circuit, a response corresponding to each group of b-bit challenges to obtain n responses corresponding to the n groups of b-bit challenges, forming a CRP by each group of b-bit challenges and the response corresponding to this group of b-bit challenges to obtain n CRPs, and forming a training dataset by the n CRPs; and Step 1-3: substituting the training dataset into the mathematic model of the PUF circuit constructed by the logistic regression machine learning algorithm, optimizing the mathematic model by a gradient descent algorithm, and when a loss function no longer decreases, stopping optimization to obtain an optimized mathematic model, which is denoted as PUFmodel, wherein the mathematic model PUFmodel satisfies r=PUFmodel(c), c represents one group of b-bit challenges, and r represents a response outputted by the mathematic model PUFmodel when c is inputted to the mathematic model PUFmodel; denoting the probability that the mathematic model PUFmodel and the PUF circuit generate a same response corresponding to the same group of b-bit challenges as p, inputting the n groups of b-bit challenges in the training dataset to the mathematic model PUFmodel, outputting, by the mathematic model PUFmodel, responses corresponding to the n groups of b-bit challenges, and calculating a matching degree of the responses corresponding to the n groups of b-bit challenges output by the mathematic model PUFmodel and the responses corresponding to the n groups of b-bit challenges in the training dataset, wherein the machining degree is p, a set threshold of p is τ, and τ is greater than 0 and less than p−1%;

Step 2: adding the PUF circuit to a sensing device to be protected, and defining an identity label TID of the sensing device, wherein the identity label TID is named by a user of the sensing device;

Step 3: generating, by a random number generator, α+1 random integers, which are denoted as h, t1, t2, . . . , and tα respectively, within [1, b] on the back-end server, wherein α is an integer which is greater than or equal to 1;

Step 4: generating β matrixes, which are denoted as M1, M2, . . . , and Mβ respectively, on the back-end server, wherein β is an integer which is greater than or equal to $2^\alpha$, each matrix is formed by transposition of two rows or columns randomly selected from a $\lceil\sqrt{b}\rceil$-order unit matrix, and ⌈ ⌉ is a symbol of rounding up to an integer;

Step 5: storing the identity label TID of the sensing device, the mathematic model PUFmodel, h, t1, t2, . . . , tα, M1, M2, . . . , and Mβ in the back-end server, and constructing, in the back-end server, a database addressing relation for calling the mathematic model PUFmodel, h, t1, t2, . . . , tα, M1, M2, . . . , and Mβ by the identity label TID;

Step 6: storing the identity label TID, h, t1, t2, . . . , tα, M1, M2, . . . , and Mβ in the sensing device;

Step 7: when the sensing device receives an identity authentication request, randomly generating, by the sensing device, a one-bit binary number N, and then synchronously sending N and the identity label TID of the sensing device to the back-end server;

Step 8: when the back-end server receives the identity label TID, searching for the identity label TID in the back-end server, if the identity label TID received by the back-end server is identical with the identity label TID pre-stored in the back-end server, calling, by the back-end server, the mathematic model PUFmodel, h, t1, t2, . . . , tα, M1, M2, . . . , and Mβ based on the database addressing relation, and then performing Step 9; else if the identity label TID received by the back-end server is different from the identity label TID pre-stored in the back-end server, determining that the authentication fails, and disabling signal transmission of the sensing device;

Step 9: generating, on the back-end server, i groups of b-bit challenges for authentication, wherein any two groups of b-bit challenges in the i groups of b-bit challenges are different, i is an integer which is greater than or equal to 100 and less than or equal to $2^b$, the i groups of b-bit challenges are all binary data, a $w^{th}$ group of b-bit challenges in the i groups of b-bit challenges is denoted as $C_{IDw}$, and w=1, 2, . . . , and i;

Step 10: in the back-end server, sequentially performing an XOR operation on the numerical value of each bit in each group of b-bit challenges generated in Step 9 with N and $C_{IDwh}$ to obtain corresponding results, wherein $C_{IDwh}$ is the numerical value of an $h^{th}$ bit in the $w^{th}$ group of b-bit challenges; the result obtained by performing the XOR operation on the numerical value of an $l^{th}$ bit in the $w^{th}$ group of b-bit challenges with N and $C_{IDwh}$ is denoted as $C_{ISwl}$, and $C_{ISwl}=C_{IDwl}\oplus N\oplus C_{IDwh}$, wherein $C_{IDwl}$ is the numerical value of the $l^{th}$ bit in the $w^{th}$ group of b-bit challenges, l=1, 2, . . . , and b, and ⊕ is a symbol of the XOR operation; after $C_{IDw1}$ to $C_{IDwb}$ are obtained, $C_{IDw1}$ to $C_{IDwb}$ are combined to form $C_{ISw}$, wherein $C_{IDwl}$ is the numerical value of the $l^{th}$ bit in $C_{ISw}$, $C_{ISw}$ is substituted into the mathematic model PUFmodel as a challenge to obtain a corresponding response, which is denoted as $R_{ISw}$, and $R_{ISw}$=PUFmodel($C_{ISw}$);

Step 11: sending, by the back-end server, $C_{IDw}$ and $R_{ISw}$ to the sensing device, and when the sensing device receives $C_{IDw}$ and $R_{ISw}$, sequentially performing the XOR operation on the numerical value of each bit of $C_{IDw}$ with N and $C_{IDwh}$ through the method in Step 10 to obtain results $C_{ISw1}$ to $C_{ISwb}$, then combining $C_{ISw1}$ to $C_{ISwb}$ to form $C_{ISw}$, and inputting $C_{ISw}$ to the PUF circuit to obtain a response, which is denoted as $R_{Dw}$;

Step 12: combining $R_{IS1}$ to $R_{Isi}$ by the sensing device to form $R_{IS}$, wherein $R_{ISw}$ is the numerical value of a $w^{th}$ bit in $R_{IS}$; combining $R_{D1}$ to $R_{Di}$ to form $R_D$, wherein $R_{Dw}$ is the numerical value of a $w^{th}$ bit in $R_{Dev}$; calculating, by the sensing device, a Hamming distance between $R_{IS}$ and $R_{Dev}$; if the Hamming distance is less than or equal to 1-τ, performing Step 13; else if the distance is greater than 1-τ, determining that the authentication fails, and disabling data transmission of the sensing device;

Step 13: setting a parameter $k_w$ and a parameter $C_{Mw}$ for $C_{IDw}$ on the sensing device, and $k_w=C_{IDwt1}\times 2^0+C_{IDwt2}\times 2^1+ \ldots +C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$, wherein · is a symbol of matrix multiplication, and × is a symbol of multiplication;

Step 14: inputting $C_{Mw}$ to the PUF circuit in the sensing device as a challenge to obtain a response $R_{Devw}$, and combining $R_{Dev1}$ to $R_{Devi}$ to form $R_{Dev}$, wherein $R_{Devw}$ is the numerical value of a $w^{th}$ bit in $R_{Dev}$; transmitting, by the sensing device, $R_{Dev}$ to the back-end server;

Step 15: when the back-end server receives $R_{Dev}$, setting a parameter $k_w$ and a parameter $C_{Mw}$ for $C_{IDw}$, and $k_w=C_{IDwt1}\times 2^0+C_{IDwt2}\times 2^1+ \ldots +C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$;

Step 16: substituting $C_{Mw}$ into the mathematic model PUFmodel in the back-end server to obtain a corresponding response $R_{Serw}$, wherein $R_{Serw}$=PUFmodel $(C_{Mw})$; combining $R_{Ser1}$ to $R_{Seri}$ to form $R_{Ser}$; and Step 17: calculating, by the back-end server, a Hamming distance between $R_{Dev}$ and $R_{Seri}$; if the Hamming distance is less than or equal to 1-τ; determining that the authentication succeeds, and enabling data communication of the sensing device; else if the Hamming distance is greater than 1-τ, determining that the authentication fails, and disabling data transmission of the sensing device.

Compared with the prior art, the invention has the following advantages: α+1 random integers and β matrixes formed by transposition of two rows or columns randomly selected from a $\lceil \sqrt{b} \rceil$-order unit matrix are generated in the back-end server in advance to be used for encryption, the complexity of the authentication process can be changed by changing the number α+1 of the random integers and the number β of the matrixes, and with the increase of the number of matrixes used for authentication, the security will be improved, but the expenditure of the device will also be increased, so in the invention, the complexity of encryption is configured according to the device environment, such that unnecessary device expenditure is reduced, and resource waste of the sensing layer is reduced greatly; moreover, the authentication method provided by the invention realizes device identification based on a preset encryption method and a mathematic model PUFmodel, information to be synchronized between the sensing device and the back-end server, including the mathematic model PUFmodel and configured data, is transmitted in the registration phase (Step 1 to Step 6), the unique information that can be acquired by an attacker through a channel in the identity verification phase (Step 7 to Step 17) is $C_{IDw}$, $R_{ISw}$ and $R_{Devw}$, w=1, 2, . . . , and i, so even if the attacker acquires a large amount of channel information, he/she cannot obtain confidential information such as h, t1, t2, . . . , tα, M1, M2, . . . , Mβ, and PUFmodel, such that the information security of the sensing device is guaranteed; although the attacker may attempt to crack the authentication method by enumerating all possible cases, for a strong PUF required b-bit challenges, the encryption methods may be configured in b cases, $2^m$ encryption matrixes may be configured in $C_m^b$ cases, and if the number of encryption matrix sets is s, there will be $C_s^{2^m}$ cases for the encryption matrixes, wherein $C_m^n$ represents a number combination operation, and $$C_m^n = \frac{m!}{n!(m-n)!};$$

with the increase of m, the number of combinations will increase exponentially, and in actual application, there may be trillions of optional combinations, so the attacker cannot traverse or completely crack all these possible combinations in a short time, and the authentication method provided by the invention can resist violent cracking and attacks; in addition, if the attacker sends an identity verification request to the back-end server as the sensing device based on some intercepted CRPs, the sensing device will only send randomly generated data $C_{Idw}$, which is scarcely possible to match the CRP collected by the attacker, and with the increase of the number b of bits of challenges and the quick convergence to 0, the accuracy of random guessing is only 50%, which is far less than the threshold, so the identity verification launched by the attacker will not succeed, and the authentication method provided by the invention can resist replay attacks. Therefore, the authentication method provided by the invention has a high anti-attack capacity, can enhance the authentication security of IoT sensing devices, and can greatly reduce resource waste of the sensing layer.

DESCRIPTION OF THE EMBODIMENTS

The present disclosure provides a device encrypted authentication method based on a strong physical unclonable function and a system using the same which have a high anti-attack capacity, can enhance the authentication security of IoT sensing devices, and can greatly reduce resource waste of the sensing layer. The following is a detailed explanation of the specific implementation of the present disclosure, with reference to the accompanying drawings. The examples of the embodiments are illustrated in the accompanying drawings. The embodiments described below with reference to the accompanying drawings are exemplary and are used to explain the present disclosure, rather than being interpreted as limiting the present disclosure.

Unless defined otherwise, all terms (including technical and scientific terms) used herein have the same meaning as commonly understood by one of ordinary skill in the art to which the present disclosure belongs. Terms defined in a general dictionary may be interpreted with the same meaning as the meaning in the context of the related art and are not to be interpreted to have ideal or excessively formal meanings unless specifically defined as such.

In order to make the purpose, technical solution and advantage of the present disclosure clearer, the following is a further detailed description of the implementation of the present disclosure in conjunction with the accompanying drawings.

Figure 1:
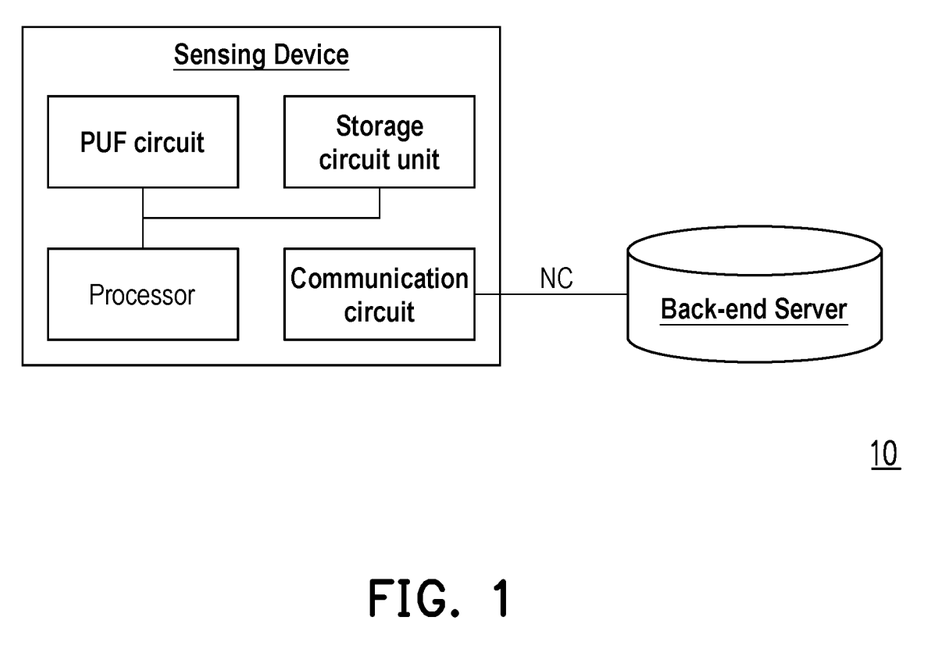
FIG. 1 depicts a block diagram of according to an embodiment of the present disclosure.
Figure 2A:
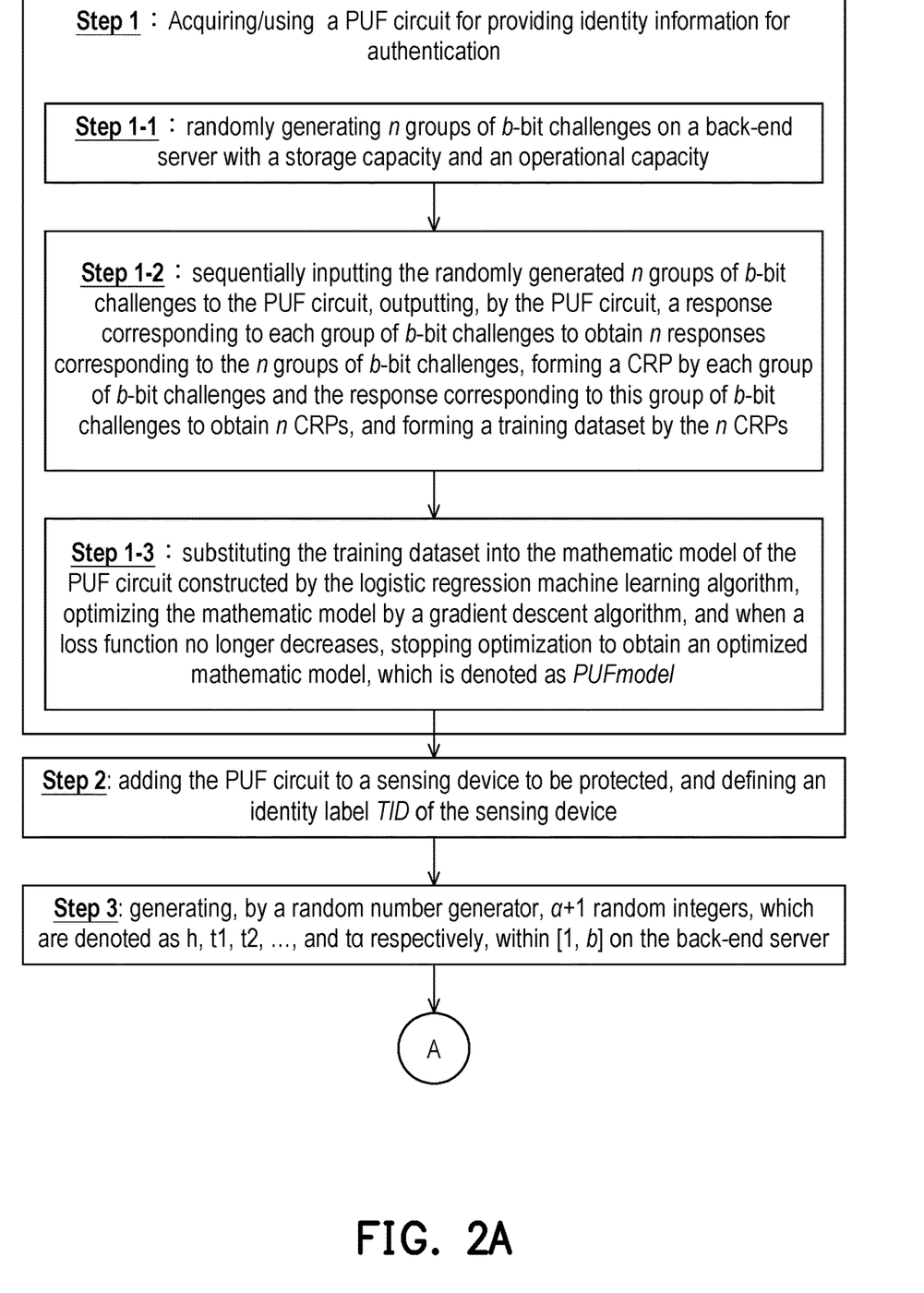
FIGS. 2A to 2D depict a flow chart for a device encrypted authentication method based on a strong physical unclonable function according to the embodiment of the present disclosure.
Figure 2B:
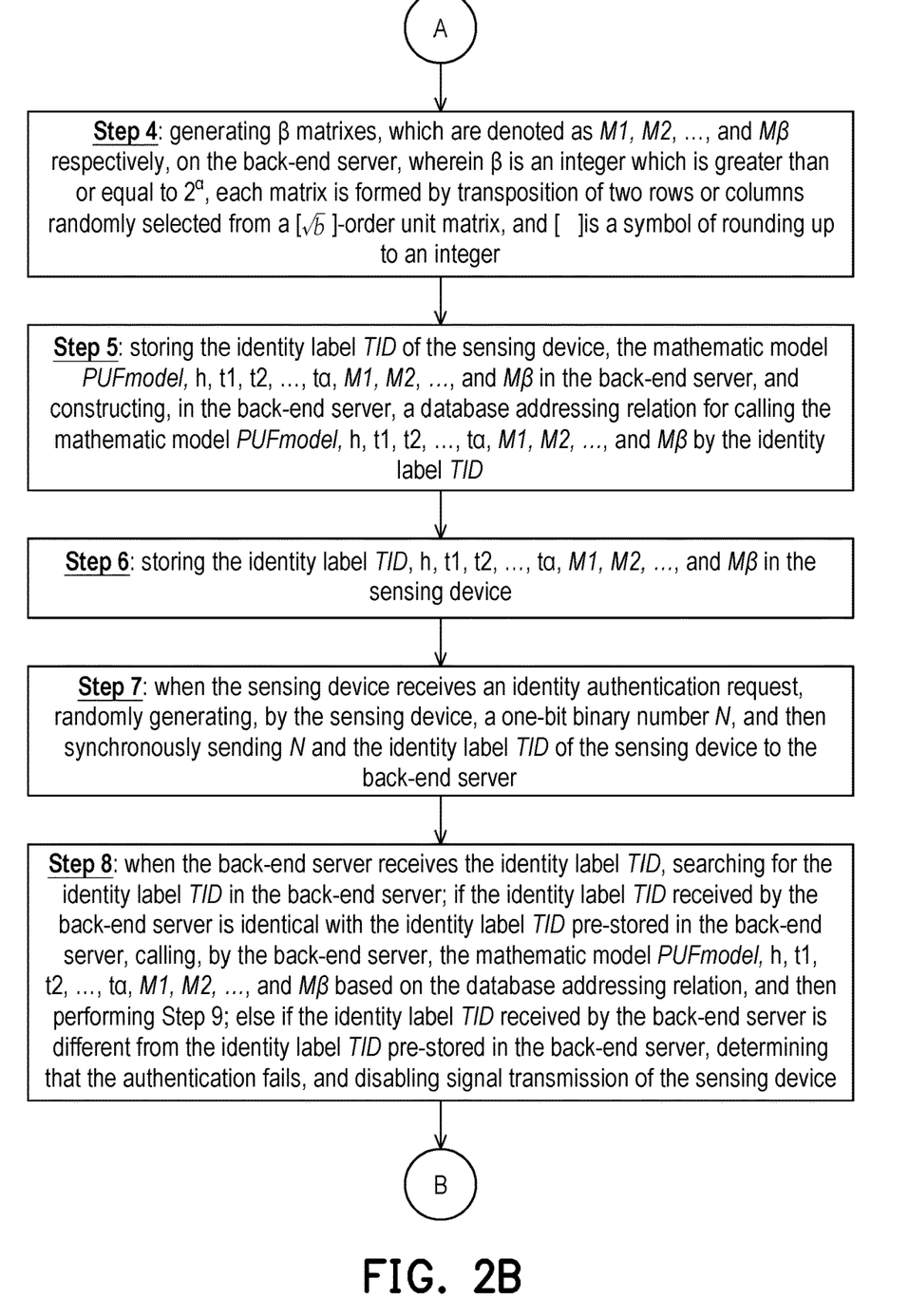
Figure 2C:
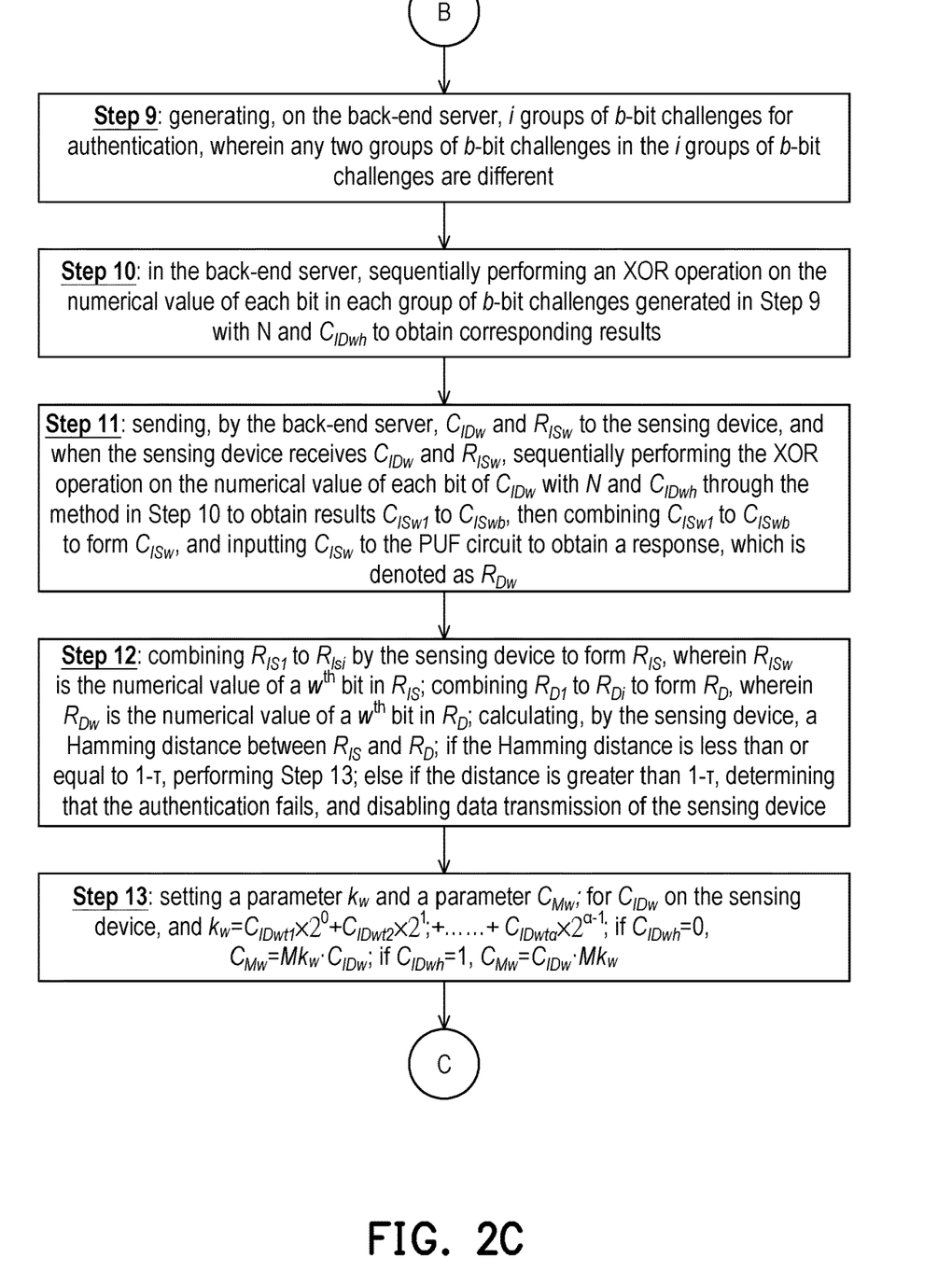
Figure 2D:
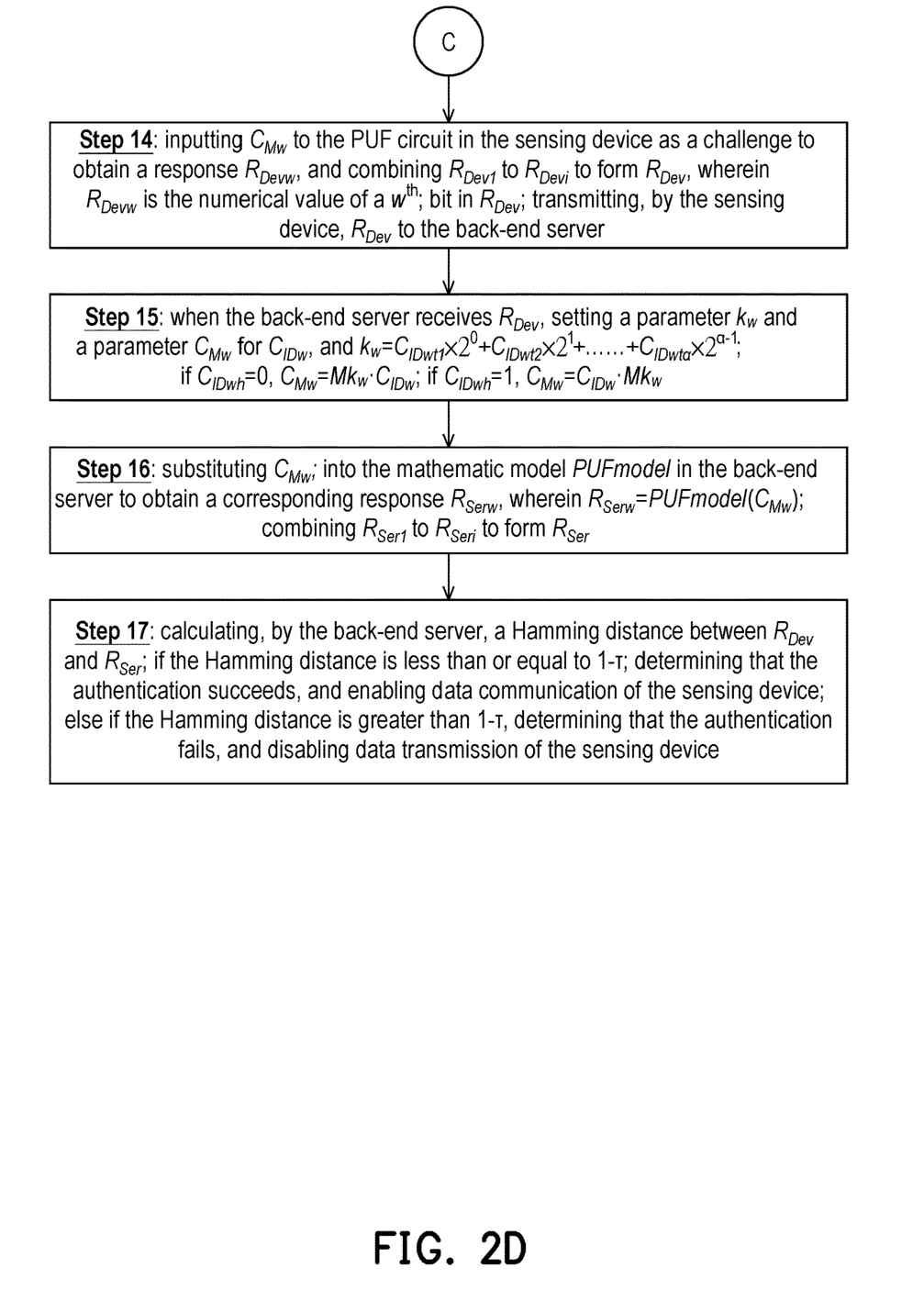

Referring to FIG. 1, an encrypted authentication system 10 includes a sensing device and a back-end server. The sensing device includes a processor, a PUF circuit, a communication circuit and a storage circuit unit. The back-end server may have at least a processor, a communication circuit and a storage circuit. Processors of the sensing device and the back-end server is hardware with computing capabilities to manage the overall operation of the sensing device and the back-end server. The processors, for example, are a core or multi-core Central Processing Unit (CPU), a microprocessor, or other programmable processing unit (Microprocessor), a Digital Signal Processor (DSP), a programmable controllers, Application Specific Integrated Circuits (ASICs), Programmable Logic Devices (PLDs) or other similar devices. The sensing device may further include a Field Programmable Gate Array (FPGA). The communication circuits are electrically coupled to the processors respectively and are used to establish a network connection NC between the sensing device and the back-end server. The communication circuits support at least one of the WiFi protocol and the Bluetooth protocol. However, the present disclosure is not limited hereto, and the communication circuits may also support other protocols, such as 3rd Generation Partnership Project (3GPP) standards, and so on. The storage circuit units are electrically coupled to the processors, respectively. The storage circuit unit can be instructed by the processor to store data and/or a database. The database is used for storing algorithms and models. The storage circuit unit includes a hard disk drive (HDD) or non-volatile memory storage device (e.g., SSD) of any type. In one embodiment, the storage circuit unit further includes a memory, such as Dynamic Random Access Memory (DRAM), Static Random Access Memory (SRAM), and the like, for temporarily storing instructions or data executed by the processor. In the embodiment, the processors are configured to execute software (e.g., programs, apps)/firmware to implement the provided method as below.

Referring to FIGS. 2A to 2D, a device encrypted authentication method based on a strong physical unclonable function comprises the following steps: step 1: Machine learning modeling; steps 2 to 6: Synchronize encrypted information; step 7: Apply for certification; steps 8 to 12: Server authentication; and steps 13 to 17: Device authentication.

In more detail, Step 1: acquiring/using a PUF circuit for providing identity information for authentication, wherein the PUF circuit is a strong PUF constructed based on an APUF; denoting the number of bits of input challenges of the PUF circuit as b, wherein b is an integer which is greater than or equal to 10; then, constructing a mathematic model of the PUF circuit by a logistic regression machine learning algorithm, which specifically comprises:

Step 1-1: randomly generating n groups of b-bit challenges on a back-end server with a storage capacity and an operational capacity, wherein n is an integer which is greater than or equal to 1000 and less than or equal to $2^b$, and the n groups of b-bit challenges are all binary data;

Step 1-2: sequentially inputting the randomly generated n groups of b-bit challenges to the PUF circuit, outputting, by the PUF circuit, a response corresponding to each group of b-bit challenges to obtain n responses corresponding to the n groups of b-bit challenges, forming a CRP by each group of b-bit challenges and the response corresponding to this group of b-bit challenges to obtain n CRPs, and forming a training dataset by the n CRPs; and Step 1-3: substituting the training dataset into the mathematic model of the PUF circuit constructed by the logistic regression machine learning algorithm, optimizing the mathematic model by a gradient descent algorithm, and when a loss function no longer decreases, stopping optimization to obtain an optimized mathematic model, which is denoted as PUFmodel, wherein the mathematic model PUFmodel satisfies r=PUFmodel(c), c represents one group of b-bit challenges, and r represents a response outputted by the mathematic model PUFmodel when c is inputted to the mathematic model PUFmodel; denoting the probability that the mathematic model PUFmodel and the PUF circuit generate a same response corresponding to the same group of b-bit challenges as p, inputting the n groups of b-bit challenges in the training dataset to the mathematic model PUFmodel, outputting, by the mathematic model PUFmodel, responses corresponding to the n groups of b-bit challenges, and calculating a matching degree of the responses corresponding to the n groups of b-bit challenges output by the mathematic model PUFmodel and the responses corresponding to the n groups of b-bit challenges in the training dataset, wherein the machining degree is p, a set threshold of p is $\tau$, and $\tau$ is greater than 0 and less than p−1%;

Step 2: adding the PUF circuit to a sensing device to be protected, and defining an identity label TID of the sensing device, wherein the identity label TID is named by a user of the sensing device;

Step 3: generating, by a random number generator, $\alpha$+1 random integers, which are denoted as h, t1, t2, ..., and t$\alpha$ respectively, within [1, b] on the back-end server, wherein $\alpha$ is an integer which is greater than or equal to 1;

Step 4: generating $\beta$ matrixes, which are denoted as M1, M2, ..., and M$\beta$ respectively, on the back-end server, wherein $\beta$ is an integer which is greater than or equal to $2^\alpha$, each matrix is formed by transposition of two rows or columns randomly selected from a $\lceil\sqrt{b}\rceil$-order unit matrix, and $\lceil\ \rceil$ is a symbol of rounding up to an integer;

Step 5: storing the identity label TID of the sensing device, the mathematic model PUFmodel, h, t1, t2, ..., t$\alpha$, M1, M2, ..., and M$\beta$ in the back-end server, and constructing, in the back-end server, a database addressing relation for calling the mathematic model PUFmodel, h, t1, t2, ..., t$\alpha$, M1, M2, ..., and M$\beta$ by the identity label TID;

Step 6: storing the identity label TID, h, t1, t2, ..., t$\alpha$, M1, M2, ..., and M$\beta$ in the sensing device;

Step 7: when the sensing device receives an identity authentication request, randomly generating, by the sensing device, a one-bit binary number N, and then synchronously sending N and the identity label TID of the sensing device to the back-end server;

Step 8: when the back-end server receives the identity label TID, searching for the identity label TID in the back-end server, if the identity label TID received by the back-end server is identical with the identity label TID pre-stored in the back-end server, calling, by the back-end server, the mathematic model PUFmodel, h, t1, t2, ..., t$\alpha$, M1, M2, ..., and M$\beta$ based on the database addressing relation, and then performing Step 9; else if the identity label TID received by the back-end server is different from the identity label TID pre-stored in the back-end server, determining that the authentication fails, and disabling signal transmission of the sensing device;

Step 9: generating, on the back-end server, i groups of b-bit challenges for authentication, wherein any two groups of b-bit challenges in the i groups of b-bit challenges are different, i is an integer which is greater than or equal to 100 and less than or equal to $2^b$, the i groups of b-bit challenges are all binary data, a $w^{th}$ group of b-bit challenges in the i groups of b-bit challenges is denoted as $C_{IDw}$, and w=1, 2, ..., and i;

Step 10: in the back-end server, sequentially performing an XOR operation on the numerical value of each bit in each group of b-bit challenges generated in Step 9 with N and $C_{IDwh}$ to obtain corresponding results, wherein $C_{IDwh}$ is the numerical value of an $h^{th}$ bit in the $w^{th}$ group of b-bit challenges; the result obtained by performing the XOR operation on the numerical value of an $l^{th}$ bit in the $w^{th}$ group of b-bit challenges with N and $C_{IDwh}$ is denoted as $C_{IDwl}$, and $C_{ISwl}$r=$C_{IDwl}\oplus N \oplus C_{IDwh}$, wherein $C_{IDwl}$ is the numerical value of the $l^{th}$ bit in the $w^{th}$ group of b-bit challenges, l=1, 2, ..., and b, and $\oplus$ is a symbol of the XOR operation; after $C_{ISwl}$ to $C_{ISwb}$ are obtained, $C_{ISwl}$, to $C_{ISwb}$ are combined to form $C_{ISw}$, wherein $C_{ISwl}$ is the numerical value of the $l^{th}$ bit in $C_{ISw}$, $C_{ISw}$ is substituted into the mathematic model PUFmodel as a challenge to obtain a corresponding response, which is denoted as $R_{ISw}$, and $R_{ISw}$=PUFmodel($C_{ISw}$);

Step 11: sending, by the back-end server, $C_{IDw}$, and $R_{ISw}$ to the sensing device, and when the sensing device receives $C_{IDw}$ and $R_{ISw}$, sequentially performing the XOR operation on the numerical value of each bit of $C_{IDw}$ with N and $C_{IDwh}$ through the method in Step 10 to obtain results $C_{ISwl}$ to $C_{ISwb}$, then combining $C_{ISwl}$ to $C_{ISwb}$ to form $C_{ISw}$, and inputting $C_{ISw}$ to the PUF circuit to obtain a response, which is denoted as $R_{Dw}$;

Step 12: combining $R_{IS1}$ to $R_{Isi}$ by the sensing device to form $R_{IS}$, wherein $R_{ISw}$ is the numerical value of a $w^{th}$ bit in $R_{IS}$; combining $R_{D1}$ to $R_{Di}$ to form $R_D$, wherein $R_{Dw}$ is the numerical value of a $w^{th}$ bit in $R_{Dev}$; calculating, by the sensing device, a Hamming distance between $R_{IS}$ and $R_{Dev}$; if the Hamming distance is less than or equal to 1-τ, performing Step 13; else if the distance is greater than 1-τ, determining that the authentication fails, and disabling data transmission of the sensing device;

Step 13: setting a parameter $k_w$ and a parameter $C_{Mw}$ for $C_{IDw}$ on the sensing device, and $k_w = C_{IDwt1} \times 2^0 + C_{IDwt2} \times 2^1 + \ldots + C_{IDwt\alpha} \times 2^{\alpha-1}$; if $C_{IDwh}=0$, $C_{Mw}=Mk_w \cdot C_{IDw}$; if $C_{IDwh}=1$, $C_{Mw}=C_{IDw} \cdot Mk_w$, wherein · is a symbol of matrix multiplication, and × is a symbol of multiplication;

Step 14: inputting $C_{Mw}$ to the PUF circuit in the sensing device as a challenge to obtain a response $R_{Devw}$, and combining $R_{Dev1}$ to $R_{Devi}$ to form $R_{Dev}$, wherein $R_{Devw}$ is the numerical value of a $w^{th}$ bit in $R_{Dev}$; transmitting, by the sensing device, $R_{Dev}$ to the back-end server;

Step 15: when the back-end server receives $R_{Dev}$, setting a parameter $k_w$ and a parameter $C_{Mw}$ for $C_{IDw}$, and $k_w = C_{IDwt1} \times 2^0 + C_{IDwt2} \times 2^1 + \ldots + C_{IDwt\alpha} \times 2^{\alpha-1}$; if $C_{IDwh}=0$, $C_{Mw}=Mk_w \cdot C_{IDw}$; if $C_{IDwh}=1$, $C_{Mw}=C_{IDw} \cdot Mk_w$;

Step 16: substituting $C_{Mw}$ into the mathematic model PUFmodel in the back-end server to obtain a corresponding response $R_{Serw}$, wherein $R_{Serw}$=PUFmodel($C_{Mw}$); combining $R_{Ser1}$ to $R_{Seri}$ to form $R_{Ser}$; and Step 17: calculating, by the back-end server, a Hamming distance between $R_{Dev}$ and $R_{Ser}$; if the Hamming distance is less than or equal to 1-τ; determining that the authentication succeeds, and enabling data communication of the sensing device; else if the Hamming distance is greater than 1-τ, determining that the authentication fails, and disabling data transmission of the sensing device.

To verify the security of the device encrypted authentication method based on a strong physical unclonable function provided by the invention, a test platform is constructed for a functional test. Wherein, the test platform comprises a back-end server, a PC, and a Xilinx A7 Series FPGA. The FPGA generates a PUF circuit, a strong PUF used during the test is a 64-bit arbiter PUF, the PUF circuit is connected to the PC through a Serial port to simulate a sensing device, and the back-end server sends and receives instructions from the sensing device through wireless network communication. In the registration phase, the back-end server randomly generates 10,000 groups of 64-bit challenges and sends the 10,000 groups of 64-bit challenges to the sensing device, and then the 10,000 groups of 64-bit challenges are sent to the PUF circuit to obtain corresponding responses. After complete CRPs are obtained, the back-end server obtains a mathematic model of the PUF circuit by a logistic regression machine learning algorithm and trains the mathematic model to obtain a mathematic model PUFmodel. By testing, the PUF circuit modeling accuracy of the logistic regression machine learning algorithm is 99.369%, so the threshold r during the test is set to 98%. After encryption matrices and encryption methods are synchronized by performing Step 3-Step 6, TID and encrypted information of the current sensing device are packaged and stored; when the sensing device initiates an identification request, the back-end server randomly generates 1000 groups of $C_{IDw}$ for device authentication, then Step 1-Step 12 are performed, and an identification result of the back-end server is displayed by the sensing device; and after the back-end server is successfully identified by the sensing device, Step 13-Step 17 are performed, and an identification result of the sensing device is displayed by the back-end server. The authentication method provided by the invention is used to verify multiple sensing devices, all the sensing devices can be verified successfully in a natural noise environment, and all test results are normal, indicating that the authentication method provided by the invention can function normally and is suitable for authentication of IoT sensing devices.

Then, the anti-ML attack capacity of the authentication method provided by the invention is verified. Due to the fact that the authentication method provided by the invention only processes challenges and does not change the structure of the PUF circuit, the arbiter PUF (APUF) disclosed in Literature 1 "Z. He et al., "A highly reliable arbiter PUF with improved uniqueness in FPGA implementation using bit-self-test," in *IEEE Access*, vol. 8, pp. 181751-181762, 2020." can be replaced with the XOR-APUF disclosed in Literature 2 "J. Zhang et al., "A 4T/Cell amplifier-chain-based XOR PUF with strong machine learning attack resilience," in *IEEE Transactions on Circuits and Systems I: Regular Papers*, vol. 69, no. 1, pp. 366-377, January 2022." and the MPUF disclosed in Literature 3 "D. P. Sahoo et al., "A multiplexer-based arbiter PUF composition with enhanced reliability and security," in *IEEE Transactions on Computers*, vol. 67, no. 3, pp. 403-417, 2018.". 1,000,000 groups of CRPs of each type of the PUFs are acquired randomly through the FPGA, wherein 800,000 groups of CRPs are used for training, and 200,000 groups of CRPs are used for testing. Modeling is performed by three ML attack methods, namely SVM disclosed in Literature 4 "W. Noble et al., "What is a support vector machine," in Nature Biotechnology, vol. 24, pp. 1565-1567, 2006.", ANN disclosed in Literature 5 "K. Hornik, "Approximation capabilities of multilayer feedforward networks," in *Neural Networks*, vol. 4, no. 2, pp. 251-257, January 1991.", and LightGBM disclosed in Literature 6 "G. Ke et al., "Lightgbm: A highly efficient gradient boosting decision tree," in *Advances in neural information processing systems*, vol. 30, 2017.", and corresponding prediction rates are obtained. The results are shown in Table 1. If the prediction accuracy is close to 100%, it indicates that the anti-attack capacity is low; if the prediction accuracy is close to 50%, it indicates that the anti-attack capacity is high. $F_{defence}$ represents the anti-attack capacity, and the greater $F_{defence}$, the higher the anti-attack capacity.

TABLE 1

| Type of PUF | Encrypted | Attack method | Prediction accuracy | $F_{defence}$ | |
|---|---|---|---|---|---|
| APUF | Yes | SVM | 61.89% | 2.551 | 77.21↑ |
| | No | SVM | 98.95% | 0.033 | |
| | Yes | ANN | 66.27% | 1.783 | 62.21↑ |
| | No | ANN | 99.09% | 0.029 | |
| | Yes | LightGBM | 67.63% | 1.617 | 33.62↑ |
| | No | LightGBM | 98.47% | 0.048 | |
| 2XOR-APUF | Yes | SVM | 59.87% | 3.121 | 8.46↑ |
| | No | SVM | 88.75% | 0.369 | |
| | Yes | ANN | 56.97% | 4.494 | 48.77↑ |
| | No | ANN | 97.08% | 0.092 | |
| | Yes | LightGBM | 59.84% | 3.131 | 7.39↑ |
| | No | LightGBM | 87.24% | 0.424 | |
| 5XOR-APUF | Yes | SVM | 52.82% | 11.258 | 9.5↑ |
| | No | SVM | 72.33% | 1.184 | |
| | Yes | ANN | 52.30% | 13.815 | 30.6↑ |
| | No | ANN | 86.51% | 0.451 | |
| | Yes | LightGBM | 53.65% | 8.683 | 6.76↑ |
| | No | LightGBM | 71.04% | 1.286 | |
| 2-MPUF | Yes | SVM | 56.97% | 4.494 | 22.92↑ |
| | No | SVM | 93.83% | 0.196 | |
| | Yes | ANN | 57.79% | 4.004 | 90.28↑ |
| | No | ANN | 98.59% | 0.044 | |
| | Yes | LightGBM | 57.20% | 4.345 | 22.15↑ |
| | No | LightGBM | 93.83% | 0.196 | |
| 4-MPUF | Yes | SVM | 59.50% | 3.251 | 11.99↑ |
| | No | SVM | 91.57% | 0.271 | |
| | Yes | ANN | 60.65% | 2.876 | 25.04↑ |
| | No | ANN | 96.36% | 0.115 | |
| | Yes | LightGBM | 59.81% | 3.141 | 11.14↑ |
| | No | LightGBM | 91.25% | 0.282 | |

As seen from Table 1, by adopting the authentication method provided by the invention, the prediction rates of the attack methods for the strong PUFs are decreased significantly and the anti-attack performance is improved to different degrees. In Table 1, 2XOR-APUF defines that treating two XOR responses of the same challenges APUF as the final response of a strong PUF; 5XOR-APUF defines that treating five XOR responses of the same challenges APUF as the final response of a strong PUF; 2-MPUF defines that inputting a response of the APUF to a 2-select-1 selector, so as to generate an output as the final response of the strong PUF; 4-MPUF defines that inputting a response of the APUF to a 4-select-1 selector, so as to generate an output as the final response of the strong PUF.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A device encrypted authentication method based on a strong physical unclonable function (PUF) comprises the following steps:

Step 1: acquiring a PUF circuit for providing identity information for authentication, wherein the PUF circuit is a strong PUF constructed based on an arbiter PUF (APUF); denoting the number of bits of input challenges of the PUF circuit as b, wherein b is an integer which is greater than or equal to 10; then, constructing a mathematic model of the PUF circuit by a logistic regression machine learning algorithm, which specifically comprises:

Step 1-1: randomly generating n groups of b-bit challenges on a back-end server with a storage capacity and an operational capacity, wherein n is an integer which is greater than or equal to 1000 and less than or equal to $2^b$, and the n groups of b-bit challenges are all binary data;

Step 1-2: sequentially inputting the randomly generated n groups of b-bit challenges to the PUF circuit, outputting, by the PUF circuit, a response corresponding to each group of b-bit challenges to obtain n responses corresponding to the n groups of b-bit challenges, forming a Challenge Response Pair (CRP) by each group of b-bit challenges and the response corresponding to this group of b-bit challenges to obtain n CRPs, and forming a training dataset by the n CRPs; and Step 1-3: substituting the training dataset into the mathematic model of the PUF circuit constructed by the logistic regression machine learning algorithm, optimizing the mathematic model by a gradient descent algorithm, and when a loss function no longer decreases, stopping optimization to obtain an optimized mathematic model, which is denoted as PUFmodel, wherein the mathematic model PUFmodel satisfies r=PUFmodel(c), c represents one group of b-bit challenges, and r represents a response outputted by the mathematic model PUFmodel when c is inputted to the mathematic model PUFmodel; denoting a probability that the mathematic model PUFmodel and the PUF circuit generate a same response corresponding to the same group of b-bit challenges as p, inputting the n groups of b-bit challenges in the training dataset to the mathematic model PUFmodel, outputting, by the mathematic model PUFmodel, responses corresponding to the n groups of b-bit challenges, and calculating a matching degree of the responses corresponding to the n groups of b-bit challenges output by the mathematic model PUFmodel and the responses corresponding to the n groups of b-bit challenges in the training dataset, wherein the machining degree is p, a set threshold of p is τ, and τ is greater than 0 and less than p−1%;

Step 2: adding the PUF circuit to a sensing device to be protected, and defining an identity label TID of the sensing device, wherein the identity label TID is named by a user of the sensing device;

Step 3: generating, by a random number generator, α+1 random integers, which are denoted as h, t1, t2, . . . , and tα respectively, within [1, b] on the back-end server, wherein α is an integer which is greater than or equal to 1;

Step 4: generating β matrixes, which are denoted as M1, M2, . . . , and Mβ respectively, on the back-end server, wherein β is an integer which is greater than or equal to $2^α$, each matrix is formed by transposition of two rows or columns randomly selected from a $\lceil\sqrt{b}\rceil$-order unit matrix, and ⌉ ⌈ is a symbol of rounding up to an integer;

Step 5: storing the identity label TID of the sensing device, the mathematic model PUFmodel, h, t1, t2, . . . , tα, M1, M2, . . . , and Mβ in the back-end server, and constructing, in the back-end server, a database addressing relation for calling the mathematic model PUFmodel, h, t1, t2, . . . , tα, M1, M2, . . . , and Mβ by the identity label TID;

Step 6: storing the identity label TID, h, t1, t2, . . . , tα, M1, M2, . . . , and Mβ in the sensing device;

Step 7: when the sensing device receives an identity authentication request, randomly generating, by the sensing device, a one-bit binary number N, and then synchronously sending N and the identity label TID of the sensing device to the back-end server;

Step 8: when the back-end server receives the identity label TID, searching for the identity label TID in the back-end server; if the identity label TID received by the back-end server is identical with the identity label TID pre-stored in the back-end server, calling, by the back-end server, the mathematic model PUFmodel, h, t1, t2, . . . , tα, M1, M2, . . . , and Mβ based on the database addressing relation, and then performing Step 9; else if the identity label TID received by the back-end server is different from the identity label TID pre-stored in the back-end server, determining that the authentication fails, and disabling signal transmission of the sensing device;

Step 9: generating, on the back-end server, i groups of b-bit challenges for authentication, wherein any two groups of b-bit challenges in the i groups of b-bit challenges are different, i is an integer which is greater than or equal to 100 and less than or equal to $2^b$, the i groups of b-bit challenges are all binary data, a $w^{th}$ group of b-bit challenges in the i groups of b-bit challenges is denoted as $C_{IDw}$, and w=1, 2, . . . , and i;

Step 10: in the back-end server, sequentially performing an XOR operation on the numerical value of each bit in each group of b-bit challenges generated in Step 9 with N and $C_{IDwh}$ to obtain corresponding results, wherein $C_{IDwh}$ is the numerical value of an $h^{th}$ bit in the $w^{th}$ group of b-bit challenges; the result obtained by performing the XOR operation on the numerical value of an $l^{th}$ bit in the $w^{th}$ group of b-bit challenges with N and $C_{IDwh}$ is denoted as $C_{ISwl}$, and $C_{ISwl}=C_{IDwl}\oplus N\oplus C_{IDwh}$, wherein $C_{IDwl}$ is the numerical value of the $l^{th}$ bit in the $w^{th}$ group of b-bit challenges, l=1, 2, . . . , and b, and $\oplus$ is a symbol of the XOR operation; after $C_{ISwl}$ to $C_{ISwb}$ are obtained, $C_{ISwl}$ to $C_{ISwb}$ are combined to form $C_{ISw}$, wherein $C_{ISwl}$ is the numerical value of the $l^{th}$ bit in $C_{ISw}$, $C_{ISw}$ is substituted into the mathematic model PUFmodel as a challenge to obtain a corresponding response, which is denoted as $R_{ISw}$, and $R_{ISw}$=PUFmodel($C_{ISw}$);

Step 11: sending, by the back-end server, $C_{IDw}$, and $R_{ISw}$ to the sensing device, and when the sensing device receives $C_{IDw}$, and $R_{ISw}$, sequentially performing the XOR operation on the numerical value of each bit of $C_{IDw}$ with N and $C_{IDwh}$ through the method in Step 10 to obtain results $C_{ISwl}$ to $C_{ISwb}$, then combining $C_{ISwl}$ to $C_{ISwb}$ to form $C_{ISw}$, and inputting $C_{ISw}$ to the PUF circuit to obtain a response, which is denoted as $R_{Dw}$;

Step 12: combining $R_{IS1}$ to $R_{Isi}$ by the sensing device to form $R_{IS}$, wherein $R_{ISw}$ is the numerical value of a $w^{th}$ bit in $R_{IS}$; combining $R_{D1}$ to $R_{Di}$ to form $R_D$, wherein $R_{Dw}$ is the numerical value of a $w^{th}$ bit in $R_{Dev}$; calculating, by the sensing device, a Hamming distance between $R_{IS}$ and $R_{Dev}$; if the Hamming distance is less than or equal to 1-τ, performing Step 13; else if the distance is greater than 1-τ, determining that the authentication fails, and disabling data transmission of the sensing device;

Step 13: setting a parameter $k_w$ and a parameter $C_{Mw}$ for $C_{IDw}$ on the sensing device, and $k_w=C_{IDwt1}\times 2^0 + C_{IDwt2}\times 2^1 + \ldots + C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$, wherein · is a symbol of matrix multiplication, and × is a symbol of multiplication;

Step 14: inputting $C_{Mw}$ to the PUF circuit in the sensing device as a challenge to obtain a response $R_{Devw}$, and combining $R_{Dev1}$ to $R_{Devi}$ to form $R_{Dev}$, wherein $R_{Devw}$ is the numerical value of a $w^{th}$ bit in $R_{Dev}$; transmitting, by the sensing device, $R_{Dev}$ to the back-end server;

Step 15: when the back-end server receives $R_{Dev}$, setting a parameter $k_w$ and a parameter $C_{Mw}$ for $C_{IDw}$, and $k_w=C_{IDwt1}\times 2^0 + C_{IDwt2}\times 2^1 + \ldots + C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$;

Step 16: substituting $C_{Mw}$ into the mathematic model PUFmodel in the back-end server to obtain a corresponding response $R_{Serw}$, wherein $R_{Serw}$=PUFmodel($C_{Mw}$); combining $R_{Ser1}$ to $R_{Seri}$ to form $R_{Ser}$; and Step 17: calculating, by the back-end server, a Hamming distance between $R_{Dev}$ and $R_{Ser}$; if the Hamming distance is less than or equal to 1-τ; determining that the authentication succeeds, and enabling data communication of the sensing device; else if the Hamming distance is greater than 1-τ, determining that the authentication fails, and disabling data transmission of the sensing device.

2. A device encrypted authentication system, comprising:
a sensing device and
a back-end server, wherein processors of the sensing device and the back-end server executes programs for implementing a device encrypted authentication method based on a strong physical unclonable function (PUF), and the method comprises the following steps:

Step 1: acquiring a PUF circuit for providing identity information for authentication, wherein the PUF circuit is a strong PUF constructed based on an arbiter PUF (APUF); denoting the number of bits of input challenges of the PUF circuit as b, wherein b is an integer which is greater than or equal to 10; then, constructing a mathematic model of the PUF circuit by a logistic regression machine learning algorithm, which specifically comprises:

Step 1-1: randomly generating n groups of b-bit challenges on a back-end server with a storage capacity and an operational capacity, wherein n is an integer which is greater than or equal to 1000 and less than or equal to $2^b$, and the n groups of b-bit challenges are all binary data;

Step 1-2: sequentially inputting the randomly generated n groups of b-bit challenges to the PUF circuit, outputting, by the PUF circuit, a response corresponding to each group of b-bit challenges to obtain n responses corresponding to the n groups of b-bit challenges, forming a Challenge Response Pair (CRP) by each group of b-bit challenges and the response corresponding to this group of b-bit challenges to obtain n CRPs, and forming a training dataset by the n CRPs; and Step 1-3: substituting the training dataset into the mathematic model of the PUF circuit constructed by the logistic regression machine learning algorithm, optimizing the mathematic model by a gradient descent algorithm, and when a loss function no longer decreases, stopping optimization to obtain an optimized mathematic model, which is denoted as PUFmodel, wherein the mathematic model PUFmodel satisfies r=PUFmodel(c), c represents one group of b-bit challenges, and r represents a response outputted by the mathematic model PUFmodel when c is inputted to the mathematic model PUFmodel; denoting a probability that the mathematic model PUFmodel and the PUF circuit generate a same response corresponding to the same group of b-bit challenges as p, inputting the n groups of b-bit challenges in the training dataset to the mathematic model PUFmodel, outputting, by the mathematic model PUFmodel, responses corresponding to the n groups of b-bit challenges, and calculating a matching degree of the responses corresponding to the n groups of b-bit challenges output by the mathematic model PUFmodel and the responses corresponding to the n groups of b-bit challenges in the training dataset, wherein the machining degree is p, a set threshold of p is $\tau$, and $\tau$ is greater than 0 and less than p−1%;

Step 2: adding the PUF circuit to a sensing device to be protected, and defining an identity label TID of the sensing device, wherein the identity label TID is named by a user of the sensing device;

Step 3: generating, by a random number generator, $\alpha+1$ random integers, which are denoted as h, t1, t2, . . . , and t$\alpha$ respectively, within [1, b] on the back-end server, wherein $\alpha$ is an integer which is greater than or equal to 1;

Step 4: generating $\beta$ matrixes, which are denoted as M1, M2, . . . , and M$\beta$ respectively, on the back-end server, wherein $\beta$ is an integer which is greater than or equal to $2^\alpha$, each matrix is formed by transposition of two rows or columns randomly selected from a $\lceil\sqrt{b}\rceil$-order unit matrix, and $\lceil\ \rceil$ is a symbol of rounding up to an integer;

Step 5: storing the identity label TID of the sensing device, the mathematic model PUFmodel, h, t1, t2, . . . , t$\alpha$, M1, M2, . . . , and M$\beta$ in the back-end server, and constructing, in the back-end server, a database addressing relation for calling the mathematic model PUFmodel, h, t1, t2, . . . , t$\alpha$, M1, M2, . . . , and M$\beta$ by the identity label TID;

Step 6: storing the identity label TID, h, t1, t2, . . . , t$\alpha$, M1, M2, . . . , and M$\beta$ in the sensing device;

Step 7: when the sensing device receives an identity authentication request, randomly generating, by the sensing device, a one-bit binary number N, and then synchronously sending N and the identity label TID of the sensing device to the back-end server;

Step 8: when the back-end server receives the identity label TID, searching for the identity label TID in the back-end server; if the identity label TID received by the back-end server is identical with the identity label TID pre-stored in the back-end server, calling, by the back-end server, the mathematic model PUFmodel, h, t1, t2, . . . , t$\alpha$, M1, M2, . . . , and M$\beta$ based on the database addressing relation, and then performing Step 9; else if the identity label TID received by the back-end server is different from the identity label TID pre-stored in the back-end server, determining that the authentication fails, and disabling signal transmission of the sensing device;

Step 9: generating, on the back-end server, i groups of b-bit challenges for authentication, wherein any two groups of b-bit challenges in the i groups of b-bit challenges are different, i is an integer which is greater than or equal to 100 and less than or equal to $2^b$, the i groups of b-bit challenges are all binary data, a $w^{th}$ group of b-bit challenges in the i groups of b-bit challenges is denoted as $C_{IDw}$, and w=1, 2, . . . , and i;

Step 10: in the back-end server, sequentially performing an XOR operation on the numerical value of each bit in each group of b-bit challenges generated in Step 9 with N and $C_{IDwh}$ to obtain corresponding results, wherein $C_{IDwh}$ is the numerical value of an $h^{th}$ bit in the $w^{th}$ group of b-bit challenges; the result obtained by performing the XOR operation on the numerical value of an $l^{th}$ bit in the $w^{th}$ group of b-bit challenges with N and $C_{IDwh}$ is denoted as $C_{ISwl}$, and $C_{ISwl}=C_{IDwl}\oplus N\oplus C_{IDwh}$, wherein $C_{IDwl}$ is the numerical value of the $l^{th}$ bit in the $w^{th}$ group of b-bit challenges, l=1, 2, . . . , and b, and $\oplus$ is a symbol of the XOR operation; after $C_{ISwl}$ to $C_{ISwb}$ are obtained, $C_{ISwl}$ to $C_{ISwb}$ are combined to form $C_{ISw}$, wherein $C_{ISwl}$ is the numerical value of the $l^{th}$ bit in $C_{ISw}$, $C_{ISw}$ is substituted into the mathematic model PUFmodel as a challenge to obtain a corresponding response, which is denoted as $R_{ISw}$, and $R_{ISw}$=PUFmodel($C_{ISw}$);

Step 11: sending, by the back-end server, $C_{IDw}$ and $R_{ISw}$ to the sensing device, and when the sensing device receives $C_{IDw}$ and $R_{ISw}$, sequentially performing the XOR operation on the numerical value of each bit of $C_{IDw}$ with N and $C_{IDwh}$ through the method in Step 10 to obtain results $C_{ISwl}$ to $C_{ISwb}$, then combining $C_{ISwl}$ to $C_{ISwb}$ to form $C_{ISw}$, and inputting $C_{ISw}$ to the PUF circuit to obtain a response, which is denoted as $R_{Dw}$;

Step 12: combining $R_{IS1}$ to $R_{ISi}$ by the sensing device to form $R_{IS}$, wherein $R_{ISw}$ is the numerical value of a $w^{th}$ bit in $R_{IS}$; combining $R_{D1}$ to $R_{Di}$ to form $R_D$, wherein $R_{Dw}$ is the numerical value of a $w^{th}$ bit in $R_{Dev}$; calculating, by the sensing device, a Hamming distance between $R_{IS}$ and $R_{Dev}$; if the Hamming distance is less than or equal to 1-$\tau$, performing Step 13; else if the distance is greater than 1-$\tau$, determining that the authentication fails, and disabling data transmission of the sensing device;

Step 13: setting a parameter $k_w$ and a parameter $C_{Mw}$ for $C_{IDw}$ on the sensing device, and $k_w=C_{IDwt1}\times 2^0+C_{IDwt2}\times 2^1+\ldots+C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$, wherein $\cdot$ is a symbol of matrix multiplication, and $\times$ is a symbol of multiplication;

Step 14: inputting $C_{Mw}$ to the PUF circuit in the sensing device as a challenge to obtain a response $R_{Devw}$, and combining $R_{Dev1}$ to $R_{Devi}$ to form $R_{Dev}$, wherein $R_{Devw}$ is the numerical value of a $w^{th}$ bit in $R_{Dev}$; transmitting, by the sensing device, $R_{Dev}$ to the back-end server;

Step 15: when the back-end server receives $R_{Dev}$, setting a parameter $k_w$ and a parameter $C_{Mw}$ for $C_{IDw}$, and $k_w=C_{IDwt1}\times 2^0+C_{IDwt2}\times 2^1+\ldots+C_{IDwt\alpha}\times 2^{\alpha-1}$; if $C_{IDwh}=0$, $C_{Mw}=Mk_w\cdot C_{IDw}$; if $C_{IDwh}=1$, $C_{Mw}=C_{IDw}\cdot Mk_w$;

Step 16: substituting $C_{Mw}$ into the mathematic model PUFmodel in the back-end server to obtain a corresponding response $R_{Serw}$, wherein $R_{Serw}$=PUFmodel($C_{Mw}$); combining $R_{Ser1}$ to $R_{Seri}$ to form $R_{Ser}$; and Step 17: calculating, by the back-end server, a Hamming distance between $R_{Dev}$ and $R_{Ser}$; if the Hamming distance is less than or equal to 1-$\tau$; determining that the authentication succeeds, and enabling data communication of the sensing device; else if the Hamming distance is greater than 1-$\tau$, determining that the authentication fails, and disabling data transmission of the sensing device.

* * * * *